(12) United States Patent
Ideshio et al.

(10) Patent No.: US 8,547,192 B2
(45) Date of Patent: Oct. 1, 2013

(54) ELECTROMAGNETIC ACTUATOR

(75) Inventors: Yukihiko Ideshio, Susono (JP); Yoshihiro Iijima, Toyota (JP); Hideaki Komada, Susono (JP); Miyoshi Kawaguchi, Kariya (JP); Hidetoshi Aoki, Susono (JP); Takaji Umeno, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 289 days.

(21) Appl. No.: 12/672,076

(22) PCT Filed: Sep. 2, 2008

(86) PCT No.: PCT/JP2008/065712
§ 371 (c)(1),
(2), (4) Date: Sep. 30, 2010

(87) PCT Pub. No.: WO2009/031512
PCT Pub. Date: Mar. 12, 2009

(65) Prior Publication Data
US 2011/0063058 A1    Mar. 17, 2011

(30) Foreign Application Priority Data
Sep. 3, 2007   (JP) ................................. 2007-228188

(51) Int. Cl.
*H01F 7/08*    (2006.01)
(52) U.S. Cl.
USPC .......................................... 335/220; 335/229

(58) Field of Classification Search
USPC ................ 335/220–229; 192/30 R, 66.1, 69, 192/69.7, 69.71, 69.8, 69.9
See application file for complete search history.

(56) References Cited

U.S. PATENT DOCUMENTS 5,687,821 A * 11/1997 Lorriette ...................... 192/52.4
2005/0194230 A1    9/2005 Tsukada

FOREIGN PATENT DOCUMENTS

| JP | 4 221810 | 8/1992 |
| JP | 6 28359 | 4/1994 |
| JP | 2002 106597 | 4/2002 |
| JP | 2003 278800 | 10/2003 |
| JP | 2004 100924 | 4/2004 |
| JP | 2004 120951 | 4/2004 |
| JP | 2005 249083 | 9/2005 |

* cited by examiner

*Primary Examiner* — Bernard Rojas
(74) *Attorney, Agent, or Firm* — Oblon, Spivak, McClelland, Maier & Neustadt, L.L.P.

(57) ABSTRACT

In an electromagnetic actuator, an electromagnetic drive section forms a flux path between a plunger and an inner yoke, each member being made of magnetic material, and which drives the plunger in an axial direction through electromagnetic force, an operation section has a dog movable between a connection position where it is connected with a mating part and a release position where it is apart from the mating part in the axial direction, and which restrains movement of the mating part in a circumferential direction when the dog is at the connection position, and a retaining ring is interposed between the plunger and the dog such that relative movement of the dog to the plunger in the circumferential direction is permitted and relative movement of the dog to the plunger in the axial direction is restricted.

13 Claims, 5 Drawing Sheets

ELECTROMAGNETIC ACTUATOR

TECHNICAL FIELD

The present invention relates to an actuator which switches a statue of power transmission utilizing electromagnetic force.

BACKGROUND ART

As a differential apparatus for a vehicle, there is known an apparatus in which a dog type clutch is disposed on a rear face side of side gears and the clutch is driven by an electromagnetic actuator to thereby lock the differential apparatus (see Patent Document 1).

Patent Document 1: JP-A-2004-100924

DISCLOSURE OF THE INVENTION

Problems to be Solved by the Invention

In an electromagnetic actuator described in Patent Document 1, while a portion of a plunger to be driven by electromagnetic force is made of magnetic material and is used as a portion of a magnetic path, the plunger is pressed against a clutch ring which serves as a mating part. Accordingly, torque inputted into the clutch ring is transmitted to a member configuring the magnetic path of an electromagnetic clutch. Therefore, the size of an entire structure is increased due to necessity of compensating for strength of members configuring the magnetic path. Further, if a portion to which the torque is inputted is configured as a portion of the magnetic path, there is a possibility that thrust force of the plunger may be varied due to such as change of a gap caused by reactive force received from the mating part, thereby causing movement of the electromagnetic actuator to be unstable.

In view of the foregoing, one object of the present invention is to provide an electromagnetic actuator which is excellent in stability of movement and is advantageous to downsizing.

Means to Solve the Problems

In an electromagnetic actuator according to the present invention, there is provided an electromagnetic drive section which forms a flux path between a movable member and a fixed member, each member being made of magnetic material, and which drives the movable member in a predetermined movement direction through electromagnetic force, an operation section which has an operation member movable between a connection position where the operation member is connected with a mating part and a release position where the operation member is apart from the mating part in a direction parallel to the movement direction, and which restrains movement of the mating part in an operation direction different from the movement direction when the operation member is at the connection position, and a connection device which is interposed between the movable member and the operation member such that relative movement of the operation member to the movable member in the operation direction is permitted and that relative movement of the operation member to the movable member in the movement direction is restricted.

According to the electromagnetic actuator of the present invention, when the movable member of the electromagnetic drive section is driven in the movement direction through electromagnetic force, the movement is also transmitted to the operation member through the connection device, and the operation member moves between the connection position and the release position. When the operation member moves to the connection position, the operation member is connected to the mating part and reaction force from the mating part acts on the operation member. However, regarding the operation direction of the reaction force, the relative movement of the operation member with respect to the movable member is permitted by the connection device, transmission of the reaction force from the operation member to the movable member is cut off by the connection device, so that the reaction force received from the mating part does not act on the movable member. Accordingly, it is not necessary to give strength withstanding the reaction force to the movable member of the electromagnetic drive section, while material for an operation member of the operation section is not limited to magnetic material, and it is possible to give priority to selection of material excellent in strength. Therefore, it is possible to downsize both the electromagnetic drive section and the operation section. Further, since the transmission of the reaction force to the movable member of the electromagnetic drive member is cut off, there is no possibility that size of gap of the magnetic path between the movable member and the fixed member disperses due to an influence of the reaction force. Therefore, dispersion of thrust given to the movable member based on the electromagnetic force is restrained, and thus, stability of movement of the electromagnetic actuator is improved.

In one embodiment of the present invention, the electromagnetic actuator may be configured such that each of the movable member, the fixed member, and the operation member is configured in an annular form and disposed on a common axis, the movable member and the fixed member are arranged in an axial direction with the movement direction being configured as the axial direction, and the operation member is provided so as to be engaged with the mating part in a circumferential direction with respect to the axis with the operation direction being configured as the circumferential direction. According to this embodiment, an entirety of the electromagnetic actuator can be configured in an annular form. In this case, an axial tip end portion may be formed on one side of the movable member in a radial direction thereof, and an oil groove may be formed on another side thereof in the radial direction. In the case where an oil groove is provided like this, when in an initial stage of movement of the movable member, a magnetic path is formed between the axial tip end portion of the movable member and the fixed member. Since the oil groove is provided on the opposite side with respect to the radial direction, a gap of the magnetic path between the movable member and the fixed member is not enlarged by the oil groove, so that there a possibility that thrust of the movable member when in the initial stage of the movement of the movable member is affected by the oil groove is low.

The electromagnetic drive section may be provided with a guide member which is made of the magnetic material and which has a cylindrical guide surface to which the movable member is fitted to guide the movable member in the movement direction, and the flux path may be formed so as to circulate among the movable member, the fixed member, and the guide member. According to this embodiment, by fitting the movable member with the guide surface of the guide member considering as a criteria, it is possible to restrain inclination of the movable member with respect to the guide member and dispersion of size of the gap of the magnetic path between the guide member and the movable member. Therefore, the movement of the movable member is further stabilized.

The electromagnetic actuator may be configured such that an end portion of the movable member, which faces the fixed member, is provided with a taper portion receding in a direction away from the fixed member along the axial direction as incrementally being separated from a guide surface in a radial direction, a rear end of the taper portion is provided with a stopper surface perpendicular to the axial direction, an end portion of the fixed member, which faces the movable member, is provided with a taper portion inclining in the same direction as that of inclination of the taper portion of the movable member, a tip end of the taper portion is provided with a stopper surface perpendicular to the axial direction and capable of contacting the stopper surface of the movable member. According to this embodiment, when in the initial stage of the movement of the movable member, the magnetic path is formed at a position where an interval between the taper portions is the narrowest, so that the movement of the movable member can be started with low current. Since the taper portions are provided, areas of the stopper surfaces are reduced, abnormal noises at the time when the stopper surfaces of the movable member and the fixed member contact each other can be restrained.

As the connection device, a connection member extending in the circumferential direction may be provided between the movable member and the operation member so as to be incapable of relatively moving with respect to the movable member and the operation member in the axial direction and to be relatively rotatable in the circumferential direction thereto. Further, the connection device may be a retaining ring. According to these embodiments, it is possible to cause a slippage in the circumferential direction between the movable member and the operation member to thereby cut off the transmission of reaction force.

The operation section may be provided with a support member engaging with the operation member so as to be incapable of relatively moving to the operation member in the operation direction and to be capable of relatively moving thereto in the movement direction when the operation member is at the connection position, and the support member may be configured to be fixed at an installation portion of the electromagnetic actuator using a fixing device. According to this embodiment, By fixing the support member to the installation portion, it is possible to transmit the reaction force received from the mating part from the operation member to the installation portion through the support member.

BEST MODE FOR CARRYING OUT THE INVENTION

Figure 1:
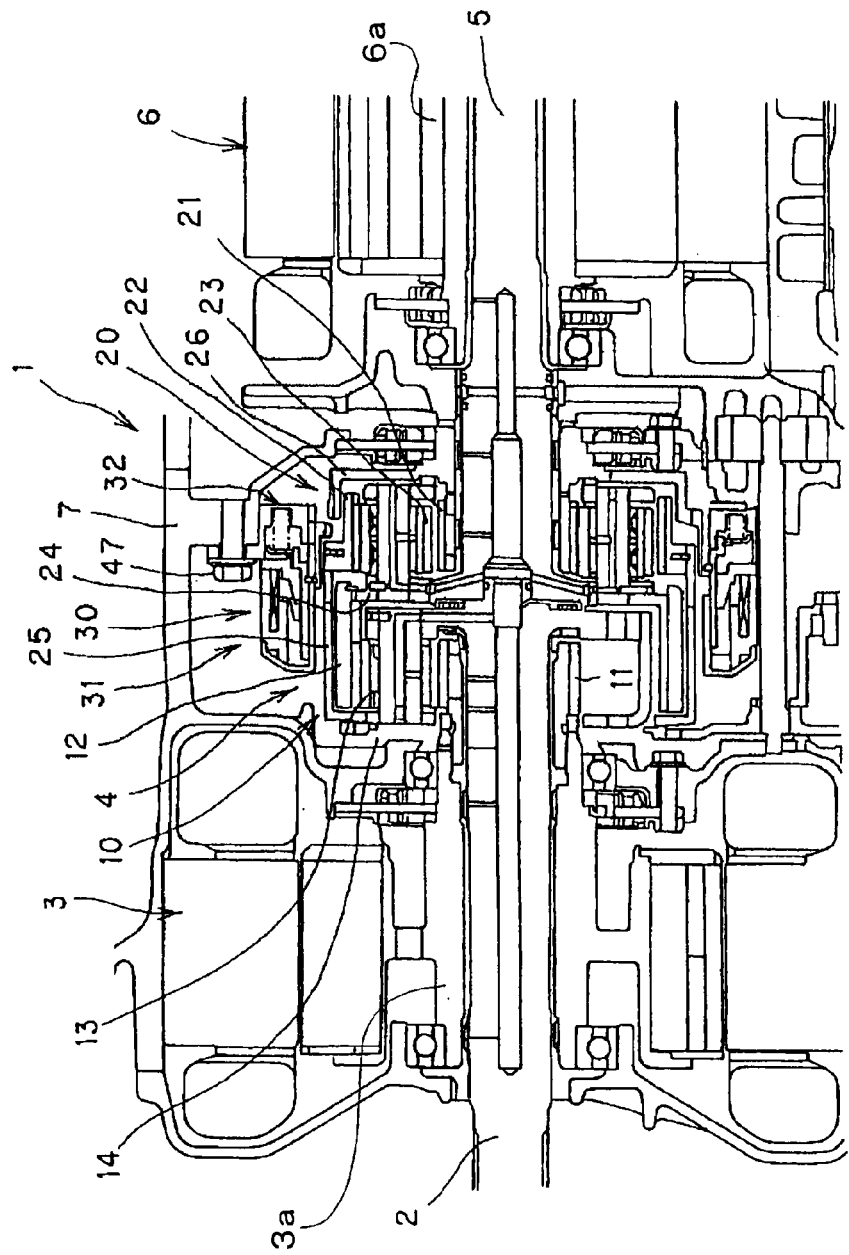
FIG. 1 is an axial sectional view of a transmission apparatus for a vehicle in which an electromagnetic actuator according to one embodiment of the present invention is incorporated.
Figure 2:
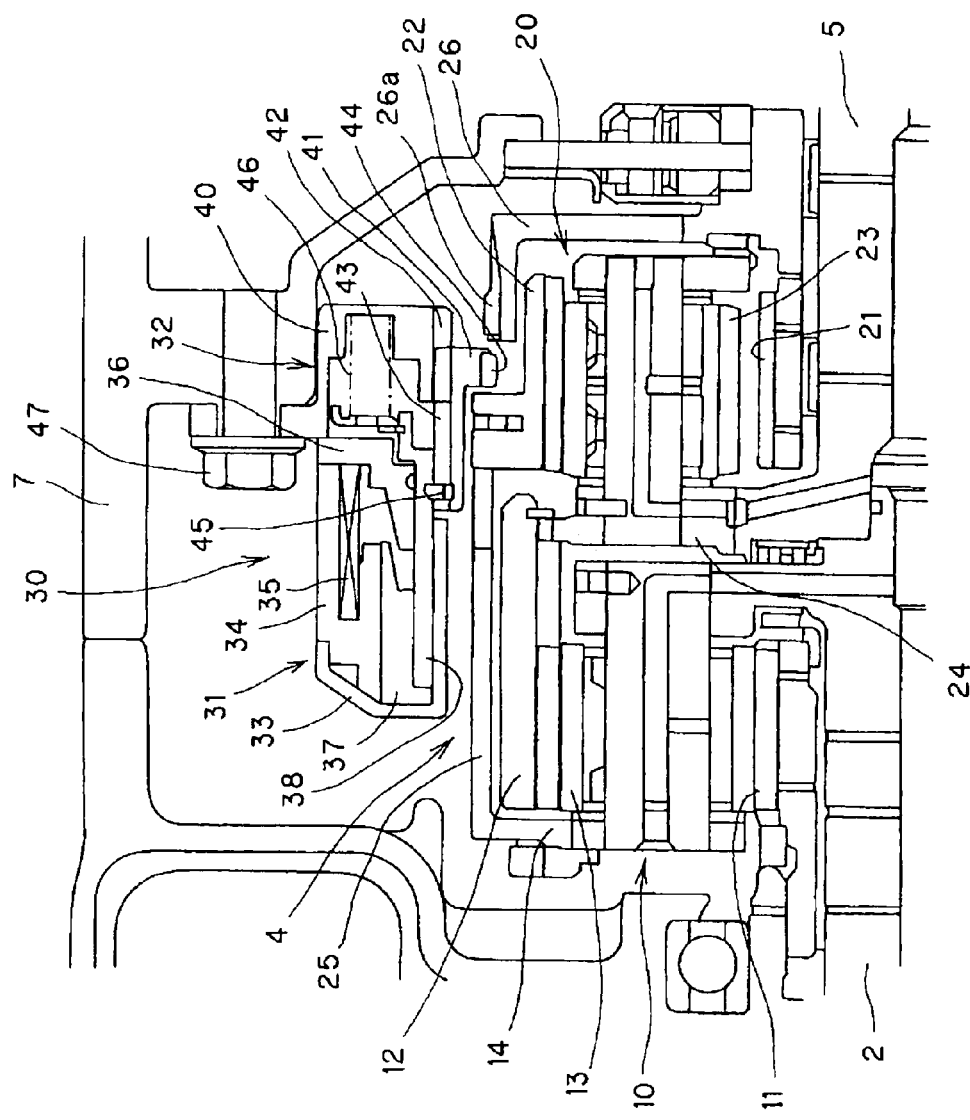
FIG. 2 is an enlarged view of a main part of FIG. 1.

FIG. 1 is an axial sectional view showing a transmission apparatus for a vehicle in which an electromagnetic actuator according to one embodiment of the present invention is incorporated, and FIG. 2 is an enlarged view of a main part thereof. A transmission apparatus 1 transmits power, which is inputted to an input shaft 2 from a crank shaft of an internal combustion engine (not shown) loaded on a vehicle, to an output shaft 5, splitting a portion of the power to a generator 3 through a power split mechanism 4. A motor 6 is provided on an outer periphery of the output shaft 5, and its output shaft 6a is connected to the output shaft 5 through a non-shown reduction mechanism. The power split mechanism 4 is provided with a first planetary gear mechanism 10 and a second planetary gear mechanism 20. The first planetary gear mechanism 10 has a sun gear 11 and a ring gear 12 which are disposed coaxially with each other, planetary pinions 13 which are interposed between the gears 11 and 12, and a planetary carrier 14 which rotatably (or revolvably) supports the planetary gears 13. The second planetary gear mechanism 20 has a sun gear 21 and a ring gear 22 which are disposed coaxially with each other, planetary pinions 23 which are interposed between the gears 21 and 22, and a planetary carrier 24 which rotatably (or revolvably) supports the planetary gear 23.

The input shaft 2 is connected to the planetary carrier 14 of the first planetary gear mechanism 10 so as to be integrally rotatable therewith. A drive shaft 3a of the generator 3 is formed in a coaxially hollow shape with the input shaft 2, and a tip end thereof is connected to the sun gear 11 of the first planetary gear mechanism 10 so as to be integrally rotatable therewith. The ring gear 12 of the first planetary gear mechanism 10 is connected to the planetary carrier 24 of the second planetary gear mechanism 20 so as to be integrally rotatable therewith, and further, the planetary carrier 24 is connected to the output shaft 5 so as to be integrally rotatable therewith. The ring gear 22 of the second planetary gear mechanism 20 is connected through a connection member 25 to the planetary carrier 14 of the first planetary gear mechanism 10 so as to be integrally rotatable therewith. The sun gear 21 of the second planetary gear mechanism 20 is disposed on an outer periphery of the output shaft 5 so as to be relatively rotatable thereto. A clutch wheel 26 is provided on a shaft end portion of the sun gear 21 so as to be integrally rotatable therewith, and clutch teeth 26a are formed on an outer periphery of the clutch wheel 26. An electromagnetic actuator 30 is provided on an outer periphery of the power split mechanism 4. By engaging the electromagnetic actuator 30 with the clutch teeth 26a, it is possible to inhibit rotation of the sun gear 21. Hereinafter, a state of inhibiting the rotation of the sun gear 21 through the electromagnetic actuator 30 is referred to as a lock state, and a state in which the rotation of the sun gear 21 is permitted is referred to as an unlock state.

The planetary carrier 14 of the first planetary gear mechanism 10 and the ring gear 22 of the second planetary gear mechanism 20 rotate at the same speed as that of the input shaft 2 around an axis of the input shaft 2 which is driven by the internal combustion engine. The sun gear 11 of the first planetary gear mechanism 10 rotates at the same speed as that of the drive shaft 3a of the generator 3. When the sun gear 21 is in the unlock state, the sun gear 21 races around the output shaft 5 at a speed corresponding to a drive speed of the output shaft 5 and the planetary carrier 24 through the motor 6 and a drive speed of the planetary carrier 14 and the ring gear 22 through the internal combustion engine, further, since the ring gear 12 rotates at the same speed as that of the planetary carrier 24, the sun gear 11 rotates at a speed corresponding to the rotational speeds of the ring gear 12 and the planetary carrier 14, and thus the generator 3 is driven. In this case, the drive speed of the output shaft 5 through the motor 6 and the drive speed of the input shaft 2 through the internal combustion engine can be configured freely with each other, and the sun gear 21 races around the output shaft 5 so as to absorb rotational speed differentiation. On the other hand, when a state of the sun gear 21 is switched to the lock state, there is established a relationship that, in the second planetary gear mechanism 20, if the rotational speed of either the ring gear 22 or the planetary carrier 24 is configured, the other rotational speed is likewise configured. In this case, the drive speed of the input shaft 2 through the internal combustion engine and the drive speed of the output shaft 5 through the motor 6 are associated with each other, and, if either of these drive speeds is configured, the drive speed of the generator 3 through the sun gear 11 is likewise configured. This lock state is used, for example, in a case where the rotational speed of the output shaft 5 is set in a high speed range.

Figure 3:
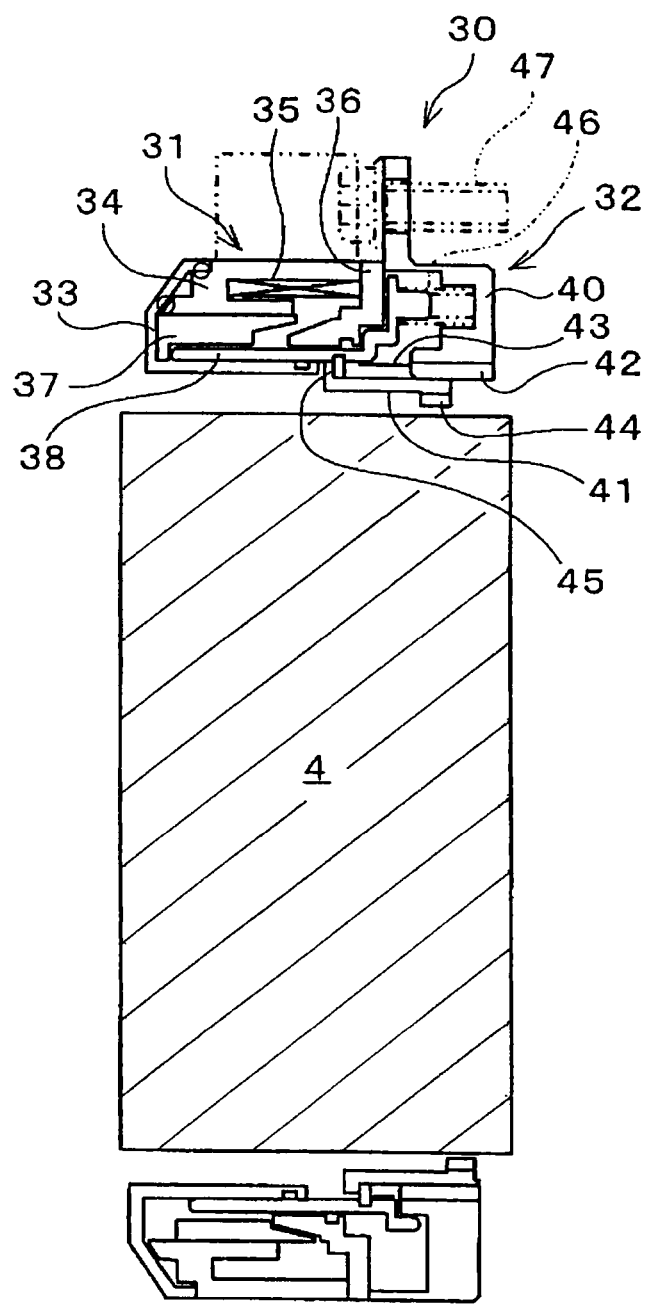
FIG. 3 is a view showing a layout of a power split mechanism and the electromagnetic actuator.

Next, the detail of the electromagnetic actuator 30 will be explained. As shown in FIG. 3, the electromagnetic actuator 30 is assembled as an assembly part in advance and disposed on an outer periphery of the transmission mechanism 4 (indicated in a hatching region in FIG. 3). By taking such kind of layout, it is not necessary to dispose the electromagnetic actuator 30 to offset in the axial direction for the power split mechanism 4, thereby shortening the transmission apparatus 1 in the axial direction.

Figure 4:
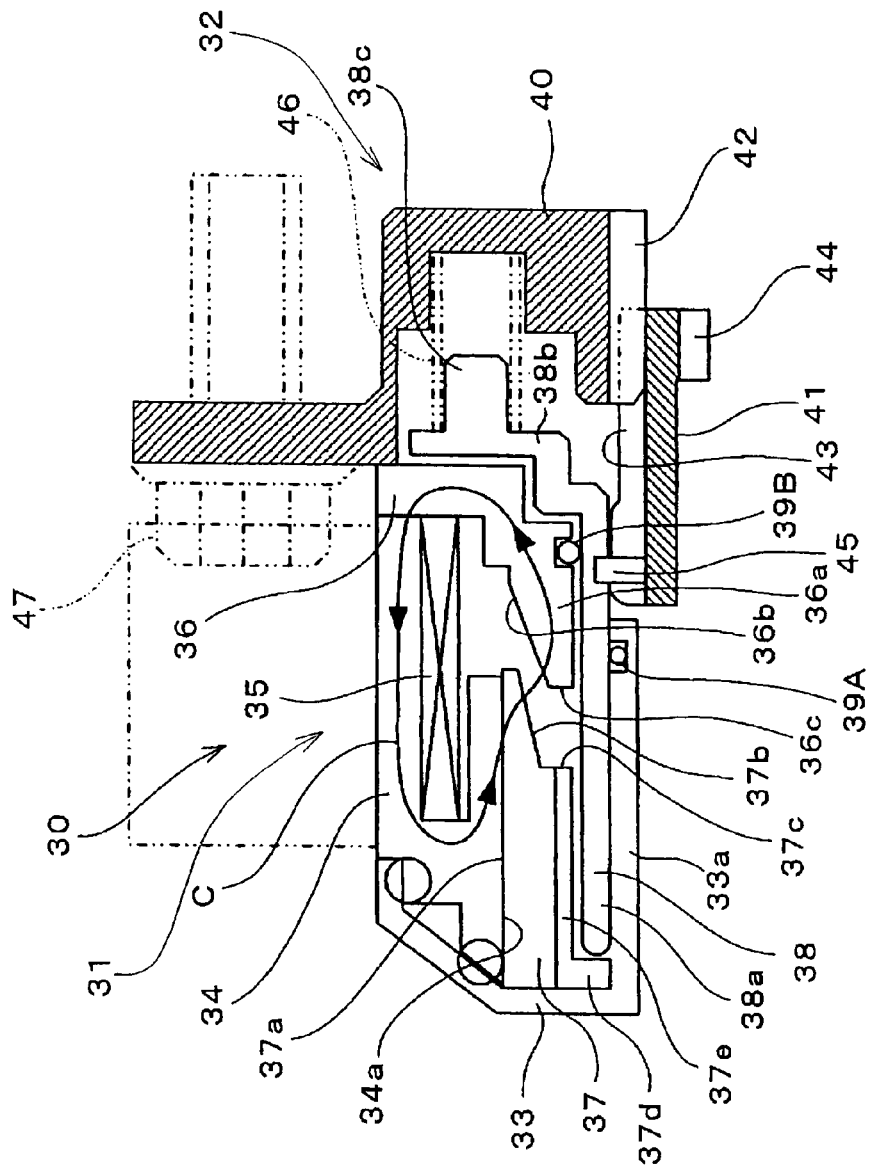
FIG. 4 is a partial sectional view taken along an axial direction of the electromagnetic actuator.

FIG. 4 is a partial sectional view taken along an axial direction of the electromagnetic actuator. The electromagnetic actuator 30 has an electromagnetic drive section 31 and an operation section 32. The electromagnetic drive section 31 is provided with a front cover 33, an outer yoke 34 housed in the front cover 33, an electromagnetic coil 35 housed in the outer yoke 34, an inner yoke 36 fixed to one end portion of the outer yoke 34, a plunger 37 fitted on an inner periphery of the outer yoke 34 to serve as a drive object, and a sleeve 38 fitted to an inner periphery of the plunger 37. On an outer periphery of the electromagnetic drive section 31, the front cover 33, the outer yoke 34, and the inner yoke 36 are closely contact each other over their entire peripheries, and thus, the front cover 33, the outer cover 34 and the inner yoke 36 substantially form a housing on an outer peripheral side of the electromagnetic drive section 31.

The outer yoke 34, the inner yoke 36, and the plunger 37 are made of electromagnetic material. When the electromagnetic coil 35 is magnetically excited, there is formed a magnetic path C circulating around the outer yoke 34, the inner yoke 36, and the plunger 37. An inner peripheral surface 34a of the outer yoke 34 is formed in a shape of a cylindrical surface. The plunger 37 is centered to be coaxial with the inner peripheral surface 34a, and the plunger 37 is movable in the axial direction along the inner peripheral surface 34a.

In an inner periphery of a tip end portion of the plunger 37, there is provided a taper portion 37b of which an internal diameter is reduced as it incrementally goes to a rear end portion of the plunger 37 in the axial direction. Further, a stopper surface 37c is provided on a rear end of the taper portion 37b so as to be perpendicular to a movement direction of the plunger 37. On the other hand, a cylindrical portion 36a extending toward the plunger 37 is provided on an inner peripheral side of the inner yoke 36. On an outer periphery of the cylindrical portion 36a, there is provided a taper portion 36b which inclines in the same direction as that of inclination of the taper portion 37b of the plunger 37. Further, on a tip end of the cylindrical portion 36a, a stopper surface 36c is provided so as to be perpendicular to the movement direction of the plunger 37.

Figure 5:
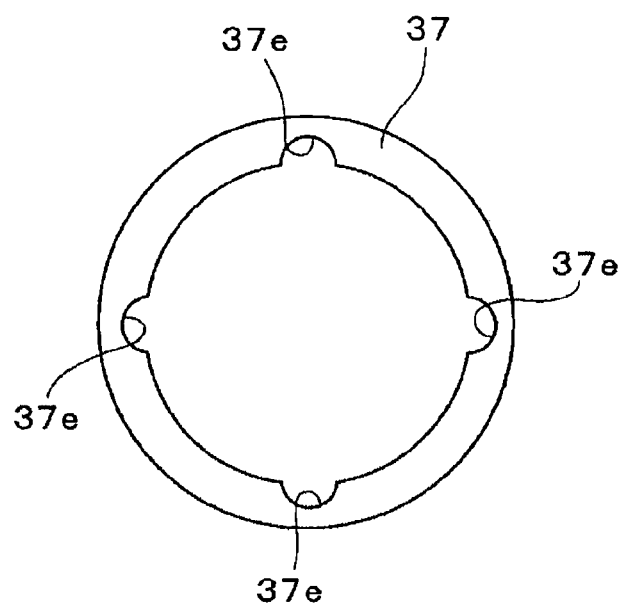
FIG. 5 is a view showing a state in which a plunger is observed from a rear end thereof in the axial direction.

On the rear end portion of the plunger 37, there is formed a sleeve catch 37d which projects in the shape of a ring to an inner peripheral side in the radial direction. The sleeve 38 has a cylindrical portion 38a fitted to an outer periphery of the cylindrical portion 33a of the font case 33, and a flange portion 38b extended to an outer peripheral side along an end surface of the inner yoke 36 from a tip end of the cylindrical portion 38a. The flange portion 38b is provided with a spring support portion 38c which projects in the axial direction. Further, oil grooves 37e are provided on the inner periphery of the plunger 37. The oil grooves 37e extend over an entire length in the axial direction of the plunger 37. As shown in FIG. 5, the oil grooves 37e are disposed at even intervals in a circumferential direction of the plunger 37. An O-ring 39A is mounted on the front cover 33 to seal between the cylindrical portion 33a and the sleeve 38, while an O-ring 39B is mounted on the inner yoke 36 to seal between the cylindrical portion 36a and the sleeve 38. Owing to these O-rings 39A and 39B, the electromagnetic drive section 31 is sealed from outside thereof except a portion of the sleeve 38. In a sealed space inside of the front cover 33, a proper quantity of lubrication oil is enclosed to thereby reduce friction resistance of the plunger 37 which serves as a movable member of the electromagnetic drive section 31 and the sleeve 38.

Return to FIG. 4, the operation section 32 is provided with a rear cover 40, a dog 41 serving as an operation member disposed on an inner peripheral side of the rear cover 40. Outer spline teeth 42 are integrally formed on an inner periphery of the rear cover 40, while inner spline teeth 43 which mesh with the outer spline teeth 42 are formed on an outer periphery of the dog 41. The spline teeth 42 and 43 are relatively movable to each other in the axial direction. Dog teeth 44 are formed on an inner periphery of the dog 41. The dog teeth 44 are capable of meshing with the clutch teeth 26a (see FIG. 2) and movable with respect to the clutch teeth 26a in the axial direction. A retaining ring 45 is provided between the dog 41 and the cylindrical portion 38a of the sleeve 38. The retaining ring 45 is capable of sliding relatively in the circumferential direction with respect to the dog 41 and the sleeve 38. Therefore, the dog 41 and the sleeve 38 are assembled so as to be incapable of relatively moving in the axial direction and to be relatively rotatable in the circumferential direction. Between the rear cover 40 and the spring support portion 38C of the sleeve 38, a return spring 46 is held in a properly compressed state. Owing to elasticity restoration force against compression of the return spring 46, the sleeve 38 is pushed toward a sleeve catch 37d of the plunger 37. Further, the rear cover 40 is fixed on the housing (installation position) 7 of the transmission apparatus 1 through a bolt 47 which serves as a fixing device (see FIG. 2). In this case, first, the rear cover 40 is centered with respect to the axis of the input shaft 2, and then the dog 41 is centered with respect to the inner spline teeth 42 of the rear cover 40. The rear cover 40 serves as a support member of the operation section 32.

Next, operation of the electromagnetic actuator 30 will be explained. First, when the electromagnetic coil 35 is in a magnetically unexcited state, the sleeve 38 is pushed toward the plunger 37 owing to the force of the return spring 46 to thereby be brought into contact with the sleeve catch 37d of the plunger 37. Therefore, the plunger 37 is pushed into the inside of the front cover 33, and as a result, the plunger 37 and the sleeve 38 are held at a standby position (a position indicated with solid lines in FIG. 4) apart from the inner yoke 36. The dog 41 is assembled with the sleeve 38 through the retaining ring 45 so as not to be relatively movable to each other in the axial direction, so that when the sleeve 38 goes back to the standby position, the dog 41 also goes back in the same direction. At this moment, an intermeshed state of the spline teeth 43 of the dog 41 and the spline teeth 42 of the rear cover 40 is maintained, while the dog teeth 44 are completely separated from the clutch teeth 26a (see FIG. 2). Namely, the dog teeth 44 and the clutch teeth 26a do not mesh with each other. Accordingly, when the electromagnetic actuator 30 is in the magnetically unexcited state, the sun gear 21 of the power split mechanism 4 is in the unlock state.

When the electromagnetic coil 35 is magnetically excited, as described above, the magnetic path C is formed in the electromagnetic drive section 31. The magnetic path C is formed so as to traverse a gap between the taper portion 37b of the plunger 37 and the taper portion 36b of the inner yoke 36. Therefore, the plunger 37 is pulled toward the inner yoke 36, being guided on the inner peripheral surface 34a of the outer yoke 34. Due to this movement of the plunger 37, the sleeve 38, which engages with the sleeve catch 37d, projects toward the rear cover 40 against the return spring 46, the movement thereof is transmitted to the dog 41 through the retaining ring 45, and thus, the dog 41 is allowed to advance toward the rear cover 40, being guided on the spline teeth 42. Therefore, the dog teeth 44 mesh with the clutch teeth 26a. Accordingly, the rotation of the sun gear 21 is inhibited. Incidentally, the plunger 37 is stopped at a position where its stopper surface 37c contacts the stopper surface 36c of the inner yoke 36.

In the aforementioned lock state, torque inputted to the sun gear 21 is transmitted from the clutch wheel 26 to the rear cover 40 through the dog 41 and is caught by a housing 7. The dog 41 and the sleeve 38 are merely engaged with each other in the axial direction though the retaining ring 45, and both of them are relatively rotatable to each other. Accordingly, the torque is not transmitted from the dog 41 to the sleeve 38. Namely, the torque is not inputted to the electromagnetic drive section 31. Therefore, it is not necessary to provide the outer yoke 34, the inner yoke 36, and the plunger 37 which are members constituting the magnetic path C with strength which can bear the torque. Thus, it is possible to downsize the electromagnetic drive section 31. Also, since the rear cover 40 and the dog 41, which are members constituting the operation section 31, are not used for the formation of the magnetic path, it is not necessary to restrict material of these members to magnetic material. Therefore, it is easy to downsize the rear cover 40 and the dog 41 by giving priority to selection of material excellent in strength for them. Thus, it is possible to downsize the entirety of the electromagnetic actuator 30. Further, since the operation section 32 is separated from the electromagnetic drive section 31, there is no possibility that the size of the gap between members constituting the magnetic path C changes due to the torque. Therefore, it is possible to restrain dispersion in thrust of the plunger 37, thereby enabling the electromagnetic actuator 30 to stably exert its movement performance.

Further, according to the electromagnetic actuator 30 of the present embodiment, there are also the following operations and advantages. First, in the electromagnetic drive section 31, since the plunger 37 is fitted to the inner peripheral surface 34a of the outer yoke 34 to thereby be centered therewith, it is possible to secure enough contact length between the plunger 37 and the outer yoke 34 in the axial direction, so that inclination of the plunger 37 relative to the outer yoke 34 can be restrained and thus degree of coaxiality between the plunger 37 and the outer yoke 34 can be maintained high. Moreover, since both the inner peripheral surface 34a of the outer yoke 34 and the outer peripheral surface 37a of the plunger 37 are in the form of a simply cylindrical surface, it is possible to improve their processing accuracies, thereby restraining dispersion in size of the gap between the outer yoke 34 and the plunger 37. Therefore, it is possible to restrain change of the magnetic field when magnetic flux traverses between the outer yoke 34 and the plunger 37. Accordingly, it is possible to stabilize the thrust of the plunger 37 further. On the other hand, in the operation section 32, the number of parts from the housing 7 to the clutch teeth 26a is small, so that dispersion of engagement can be restrained.

Since the taper portions 37b and 36b are provided to the plunger 37 and the cylindrical portion 36a of the inner yoke 36, respectively, it is possible to sufficiently reduce the amount of the gap between the plunger 37 and the inner yoke 36 at the time of starting the advance of the plunger 37 by magnetically exciting the electromagnetic coil 35 (hereinafter, the time may be referred to as an initial movement time"), and thus, enough thrust can be given to the plunger even with low electrical current. Namely, if the taper portions 37b and 36c are omitted, it is required at the initial movement time to form the magnetic path C through a gap of the size equal to a distance between the stopper faces 37c and 36c, and there is a need to supply high current to the electromagnetic coil 35. However, according to the present embodiment, as is obvious from FIG. 4, there is provided, between the taper portions 37b and 36b, a minimum gap of the size which is smallest between the plunger 37 at the standby position and the inner yoke 36. Since the minimum gap is sufficiently smaller than the distance between the stopper surfaces 37c and 36c, it is possible to act necessary and sufficient thrust on the plunger 37, even though magnetically exciting current necessary at the initial movement time is configured to be low. Further, since the taper portions 37b and 36b are provided, areas of the stopper surfaces 37c and 36c decrease. Therefore, collision energy at the time when the stopper surfaces 37c and 36c contact each other and the plunger 37 stops is restrained to be small, and abnormal noise to be generated due to the collision energy can be reduced.

Moreover, since the oil grooves 37e are formed on the inner periphery of the plunger 37, there is an advantage of raising no possibility that the gap between the plunger at the initial movement time and the inner yoke 36 is enlarged by the oil grooves 37e. Furthermore, since the oil grooves 37e are formed at even intervals in the circumferential direction, it is possible to prevent offset of the magnetic flux due to the oil grooves 37e to thereby stabilize the movement of the plunger 37.

Since, the electromagnetic drive section 31 is sealed by the O-rings 39A and 39B from the outside thereof except the portion of the sleeve 38, it is possible to prevent any foreign matter from being entered between guide surfaces of the plunger 37 and the outer yoke 34, and thus, the movement of the plunger 37 can further be stable. Further, since the return spring 46 is disposed outside of the sealed region of the electromagnetic drive section 31, even if foreign matters such as wear dust or the like are generated in accordance with expansion and contraction of the return spring 46, it is possible to prevent any foreign matter from being entered into the electromagnetic drive section 31. Since the return spring 46 is disposed so as to be offset from the electromagnetic drive section 31 in the axial direction, it is possible to downsize the electromagnetic actuator 30 in the radial direction. Therefore, even in a limited space between the power split mechanism 4 and the housing 7, the electromagnetic actuator 30 can easily be disposed.

In the aforementioned embodiment, the plunger 37 corresponds to a movable member, the inner yoke 36 corresponds to a fixed member, the outer yoke 34 corresponds to a guide member, the dog 41 corresponds to an operation member, the rear cover 40 corresponds to a support member, and the retaining ring 45 corresponds to a connection device. Further, the clutch wheel 26 corresponds to a mating part. Moreover, the axial direction of the plunger 37 corresponds to a movement direction, and the circumferential direction of the dog 41 corresponds to an operation direction. However, the present invention is not limited to the aforementioned embodiment and can be taken into practice in various embodiments. For instance, as to the connection device, it is not limited only to a retaining ring, but also a bearing or the like can be used. The electromagnetic actuator according to the present invention is not limited to an example to be used for a lock of the sun gear 21 of the aforementioned transmission apparatus 1, it can be used for various objects, further, without being limited to vehicles, it may be installed on various apparatuses, machines, and mechanisms. The electromagnetic actuator according to the present invention is not limited to an example of being provided in an annular form as a whole, it may be likewise provided in a different forms such as a linear motion type form or the like. In this case, likewise, the connection device may be interposed between both the movable member and the fixed member such that there is a difference between the movement direction of the movable member of the electromagnetic section and the operation direction of the mating part by the operation member of the operation section, that the relative movement in the movement direction between the movable member and the operation member is restricted, and that the relative movement in the operation direction is permitted. It is obviously acceptable that another member such as a sleeve may be disposed between the movable member and the operation member.

As explained above, according to the electromagnetic actuator of the present invention, it is allowable to transmit the movement of the movable member of the electromagnetic drive section to the operation member to thereby make the operation member move between the connection position and the release position, and, on the other hand, it is possible to cut off transmission of reaction force from the operation member to the movable member. Therefore, it is not necessary to give strength capable of withstanding the reaction force to the movable member of the electromagnetic drive section, and, on the other hand, without being limited material of the operation member of the operation section to magnetic material, it is possible to give priority to selection of material excellent in strength for the operation member. Accordingly, it is possible to downsize both the electromagnetic drive section and the operation section. Further, since transmission of the reaction force to the movable member of the electromagnetic drive member is prevented, there is no possibility that a gap of the magnetic path between the movable member and the fixed member is dispersed due to an influence of the reaction force, and thus, dispersion of thrust of the movable member is restrained to thereby allow improvement in stability of the movement of the electromagnetic actuator.

The invention claimed is:

1. An electromagnetic actuator comprising:
    an electromagnetic drive section which forms a flux path between a movable member and a fixed member, each member being made of magnetic material, and which drives the movable member in a predetermined movement direction through electromagnetic force;
    an operation section which has an operation member movable between a connection position where the operation member is connected with a mating part and a release position where the operation member is apart from the mating part in a direction parallel to the predetermined movement direction, and which restrains movement of the mating part in an operation direction which is different from the predetermined movement direction when the operation member is at the connection position; and
    a connection device which is interposed between the movable member and the operation member such that relative movement of the operation member to the movable member in the operation direction is permitted and that relative movement of the operation member to the movable member in the predetermined movement direction different from the operation direction is restricted, wherein
    each of the movable member, the fixed member, and the operation member is configured in an annular form and disposed on a common axis, the movable member and the fixed member are arranged in an axial direction with the predetermined movement direction being configured as the axial direction, and the operation member is provided so as to be engaged with the mating part in a circumferential direction with respect to the axis with the operation direction being configured as the circumferential direction, wherein
    a portion of the operation member which contacts the connection device is arranged in an inner circumference side of the movable member.

2. The electromagnetic actuator according to claim 1, wherein an axial tip end portion is formed on one side of the movable member in a radial direction thereof, and an oil groove is formed on another side thereof in the radial direction.

3. The electromagnetic actuator according to claim 1, wherein the electromagnetic drive section is provided with a guide member which is made of the magnetic material and which has a cylindrical guide surface to which the movable member is fitted to guide the movable member in the predetermined movement direction, and the flux path is formed so as to circulate among the movable member, the fixed member, and the guide member.

4. The electromagnetic actuator according to claim 1, wherein an end portion of the movable member, which faces the fixed member, is provided with a taper portion receding in a direction away from the fixed member along the axial direction as incrementally being separated from the guide surface in a radial direction, a rear end of the taper portion is provided with a stopper surface perpendicular to the axial direction, an end portion of the fixed member, which faces the movable member, is provided with a taper portion inclining in the same direction as that of inclination of the taper portion of the movable member, a tip end of the taper portion of the fixed member is provided with a stopper surface perpendicular to the axial direction and capable of contacting the stopper surface of the movable member.

5. The electromagnetic actuator according to claim 3, further comprising:
    a housing to enclose the guide member, movable member and fixed member; and
    a coil affixed to the guide member, the coil providing the electromagnetic force.

6. The electromagnetic actuator according to claim 5 further comprising:
    at least two o-rings to seal the housing; and
    a spring to return the movable member to an initial position when the electromagnetic force is not applied, the spring being disposed outside the housing.

7. The electromagnetic actuator according to claim 1, wherein, a connection member extending in the circumferential direction is provided as the connection device between the movable member and the operation member so as to be incapable of relatively moving with respect to the movable member and the operation member in the axial direction and to be relatively rotatable in the circumferential direction thereto.

8. The electromagnetic actuator according to claim 7, wherein the connection device is a retaining ring.

9. The electromagnetic actuator according to claim 7, wherein the connection device is a bearing.

10. The electromagnetic actuator according to claim 1, wherein the operation section is provided with a support member engaging with the operation member so as to be incapable of relatively moving to the operation member in the operation direction and to be capable of relatively moving thereto in the predetermined movement direction when the operation member is at the connection position, and the support member is configured to be fixed at an installation portion of the electromagnetic actuator using a fixing device.

11. The electromagnetic actuator according to claim 1, wherein the operation member is moved into the connection position via the connection member by the movable member.

12. The electromagnetic actuator according to claim 11, further comprising:
 a spring that returns the operation member to the release position when the movable member is not driven by the electromagnetic force.

13. The electromagnetic actuator according to claim 1, wherein the mating part is a sun gear.

* * * * *